Aug. 31, 1948.  H. E. LOWRY  2,448,318
FISH BOWL LAMP SHADE
Filed June 16, 1945
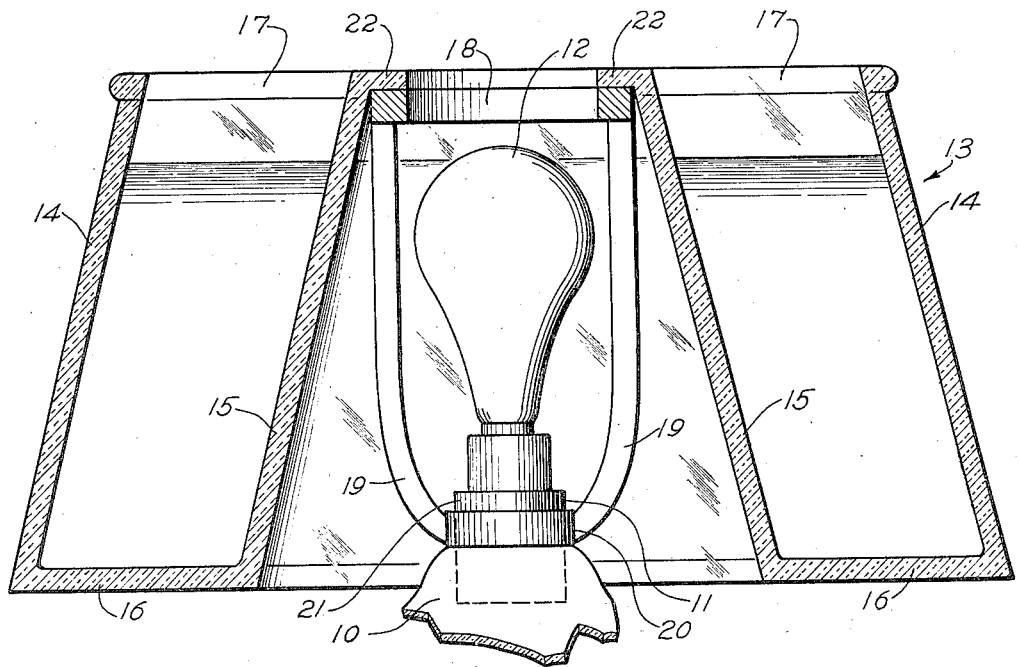
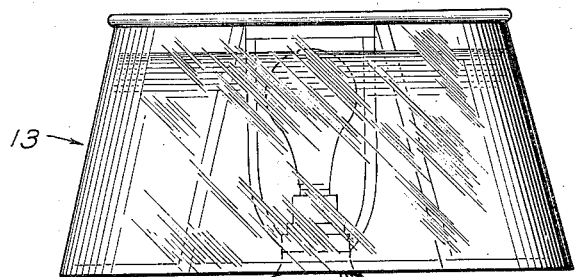
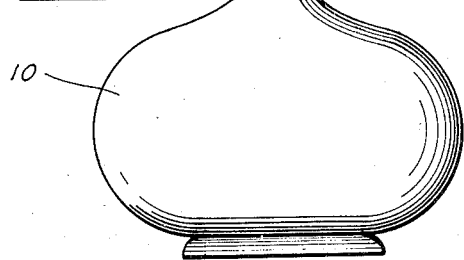
INVENTOR.
Hubert E. Lowry
BY Patented Aug. 31, 1948

2,448,318

UNITED STATES PATENT OFFICE 2,448,318

FISH BOWL LAMP SHADE

Hubert Elza Lowry, Lawndale, Calif.

Application June 16, 1945, Serial No. 599,809

2 Claims. (Cl. 240—2)

This invention relates to a combination decorative and utility device and is directed particularly to a combined lamp shade and fish globe and the principal object of the invention is to provide a water container of transparent form which may be used as a fish bowl or fish globe, which is additionally formed to be mounted over a light emitting device such as an electric bulb whereby to function also as a lamp shade.

Another object of the invention is to provide a lamp shade, preferably of circular form, though not necessarily restricted to such shape, formed of a suitable transparent material and comprising inner and outer walls and a bottom wall to form a circular receptacle capable of carrying water in which goldfish or other types of pet fish may be kept.

The invention will be best understood from a consideration of the following detailed description, taken in connection with the accompanying drawing, forming a part of the specification, with the understanding, however, that minor changes and modifications may be made in the invention so long as such changes or modifications mark no material departure from the salient features of the invention as expressed in the appended claims.

In the drawing:

Figure 1 is a view in side elevation of a lamp having mounted thereon a lamp shade and globe constructed in accordance with the present invention.

Figure 2 is a vertical sectional view, on an enlarged scale through the shade, the lower portion of the lamp structure being broken away.

Referring now more particularly to the drawing the numeral 10 generally designates the body portion of a lamp structure such as a table lamp or the like, which comprises at its top, the electric light bulb socket 11 in which the incandescent lamp 12 is placed.

In accordance with the present invention there is provided the combination water bowl or receptacle and shade which is generally designated 13 and which is here illustrated as being of circular design. However, it is to be understood that the invention is not limited to this specific design as it will be readily apparent that the globe may be made of polygonal form if desired without departing from the spirit of the invention. The description, however, will be confined to a circular structure and where the inner and outer walls are defined as being concentric or as being one within the other it will be understood that such terms are intended to cover any form of wall for the inner or outer parts of the globe, which might be used or which would be satisfactory.

In the bowl structure shown there is the outer wall 14 and the inner wall 15 which is concentric with and spaced from the outer wall.

The bottom edges of these walls are joined or connected by the annular bottom wall 16 while the top of the receptacle or the area between the top edges of the inner and outer walls, is open as indicated at 17 so that the necessary expanse of water within the bowl may be exposed at the atmosphere to absorb the required oxygen necessary for the maintenance of life in the water.

The inner and outer walls 14 and 15 are shown as being in parallel relation but it will also be readily appreciated that these walls may have an angular relation of any kind, if desired and also, if found desirable, the walls may be faceted to generally improve the appearance of the structure.

For the support of the annular globe around the lamp bulb 12 there is provided a suitable supporting frame structure which is here shown as comprising a ring 18 which is of an over-all diameter to fit snugly within the circular area defined by the inner wall 15. Formed integral with the frame ring 18 are the downwardly and inwardly converging supporting arms 19 which are connected with a suitable collar 20 designed to be clamped around the body of the bulb socket 21 or to be attached to the lamp base in any suitable manner to maintain the frame in position.

If desired the top portion of the inner wall 15 of the globe may be provided with the inturned flange 22 against which the frame ring 18 may engage thus further insuring the stability of the structure and avoiding any possibility of the frame being forced by the weight of the bowl and the water therein, through the bowl shade.

The combination fish bowl and shade will, of course, be formed of a suitable transparent material and also a water resistant material and may be cast or shaped from glass or any suitable plastic substance as desired.

From the foregoing it will be readily apparent that there is provided in the present invention a novel structure which has both decorative and utility value and combining a globe structure of this character with a light, there is not only obtained the desired lighting effect for a surrounding area of the room in which the lamp is located but the light will shine through the transparent walls of the receptacle so that goldfish or tropical fish in the receptacle will be more attractively shown or displayed.

A structure of the character herein disclosed is also of particular value in keeping tropical fish where it is desired that the temperature of the water be maintained at a higher degree than that required for goldfish since the heat radiated from the incandescent lamp 12 will be absorbed by the water so that the water can be kept at the proper temperature.

I claim:

1. A combination lamp shade and fish bowl, comprising a receptacle having spaced inner and outer walls and a bottom wall, the said inner and outer walls being of light transmitting material, the inner wall being formed to define a central area open at the top and bottom, a frame comprising an annular member disposed around the inside of the inner wall, inwardly and downwardly converging arms connected with the annular member and a clamp connected with said arms and adapted to encircle a lamp socket of an electric table lamp, said frame functioning to support the receptacle in encircling relation with an incandescent bulb forming a part of the lamp.

2. A combination bowl and lamp shade of the character stated in claim 1, in which the said inner and outer walls are disposed in spaced parallel relation and are further disposed at an outward and downward inclination.

HUBERT ELZA LOWRY.

REFERENCES CITED

The following references are of record in the file of this patent:

UNITED STATES PATENTS

| Number | Name | Date |
|---|---|---|
| 687,738 | Fleming | Dec. 3, 1901 |
| 1,263,391 | Eickemeyer | Apr. 23, 1918 |
| 1,333,454 | Sato | Mar. 9, 1920 |
| 1,341,845 | Glanding | June 1, 1920 |
| 1,871,742 | Sabath | Aug. 16, 1932 |